United States Patent [19]

Vassilatos

[11] Patent Number: 4,634,739

[45] Date of Patent: Jan. 6, 1987

[54] BLEND OF POLYETHYLENE AND POLYPROPYLENE

[75] Inventor: George Vassilatos, Wilmington, Del.

[73] Assignee: E. I. Du Pont de Nemours and Company, Wilmington, Del.

[21] Appl. No.: 788,351

[22] Filed: Oct. 22, 1985

Related U.S. Application Data

[63] Continuation-in-part of Ser. No. 686,917, Dec. 27, 1984, abandoned.

[51] Int. Cl.[4] .................... C08L 23/06; C08L 23/12
[52] U.S. Cl. .............................. 525/240; 264/176.1; 428/288
[58] Field of Search ........................................ 525/240

[56] References Cited

U.S. PATENT DOCUMENTS

| | | | |
|---|---|---|---|
| 3,097,991 | 7/1963 | Miller et al. | 162/157 |
| 3,112,160 | 11/1963 | Rush | 18/54 |
| 3,276,944 | 10/1966 | Levy | 161/150 |
| 3,335,520 | 11/1967 | Maloney et al. | 260/897 |
| 3,474,051 | 10/1969 | Chappelear et al. | 200/2.5 |
| 4,107,243 | 8/1978 | Stearns et al. | 264/13 |
| 4,189,338 | 2/1980 | Ejima et al. | 156/157 |
| 4,260,565 | 4/1981 | D'Amico et al. | 264/13 |

FOREIGN PATENT DOCUMENTS 1129052 12/1981 Japan .

OTHER PUBLICATIONS

W. H. Skoroszewski, "Parameters Affecting Processing of Polymers and Polymer Blends," *Plastics and Polymers*, vol. 40, No. 147, 142–152 (Jun. 1972).
P. Robson et al., "Drawing Behavior of Polyethylene–Polypropylene Blends," *Journal of Applied Polymer Science*, vol. 26, 3515–3521 (1981).

Primary Examiner—Carman J. Seccuro

[57] ABSTRACT

A blend of low density polyethylene and crystalline polypropylene can be melt spun at high temperature and high speed to produce a fiber. The fiber has utility as a binder fiber in nonwoven fabrics. The blend contains 5 to 35% by weight polypropylene and 95 to 65% of polyethylene.

4 Claims, 2 Drawing Figures

BLEND OF POLYETHYLENE AND POLYPROPYLENE

CROSS-REFERENCE TO RELATED APPLICATION

This application is a continuation-in-part of application Ser. No. 686,917, filed Dec. 27, 1984, now abandoned.

BACKGROUND OF THE INVENTION

1. Field of the Invention

This invention relates to a blend of low density polyethylene and crystalline polypropylene and fibers produced therefrom. In particular, the invention concerns an improved blend that can be melt-spun at high temperature and high speed into fibers which are particularly useful as binder fibers for nonwoven fabrics.

2. Description of the Prior Art

Nonwoven fabrics which contain fibers having different melting temperatures are known in the art. The fibers with the lower melting temperature act as an adhesive agent which bonds the higher melting-temperature fibers to each other. The lower melting-temperature fibers are referred to as "binder" fibers. In the manufacture of many nonwoven webs which include binder fibers, the web is compressed and heated to a temperature which causes the binder fibers to melt and bond the other fibers to each other. Temperatures which do not detrimentally affect the tensile characteristics of the non-binder fibers are desired for the binding operation.

Polyethylene, because of its relatively low melting temperature and other desirable characteristics, has been considered for use as binder fibers for nonwoven fabrics, especially for those made of polypropylene filaments. However, polyethylene generally has been found to be unsatisfactory for binder fibers because of its poor spinnability. The melt-spinning of polyethylene into fine filaments at high speed and high temperature has generally been unsatisfactory. Yet, such high temperature, high speed melt-spinning is highly desirable for successful commercial production of polyethylene binder fibers. Accordingly, it is an object of this invention to provide a composition that can be melt-spun at high speed and high temperature into binder fibers that would have melting characteristics similar to those of polyethylene.

Many blends of polyethylene and polypropylene are known in the art. For example, *Plastics and Polymers*, Vol. 40, No. 147, pages 142–152, "Parameters Affecting Processing of Polymers and Polymer Blends," by W. H. Skoroszewski, (June, 1972) discloses blends of polyethylene in polypropylene, with the polypropylene being the major component and high or low density polyethylene being the minor component. Other blends of linear (i.e., high density) polyethylene and polypropylene are disclosed, for example, in *Journal of Applied Polymer Science*, Vol. 26, 3515–3521, "Drawing Behavior of Polyethylene-Polypropylene Blends" by P. Robson et al. (1981).

Blends of low density polyethylene and isotactic polypropylene are known for various purposes. For example, Maloney et al., U.S. Pat. No. 3,355,520, suggests that branched polyethylene in which is incorporated polypropylene amounting to 3.1 to 5.3% (by weight of the polyethylene) improves the wire-coating, film, and bottle-forming characteristics of the polymer. The examples of Maloney et al. disclose branched polyethylene of 0.922 and 0.970 g/cm$^3$ density and 0.17 and 0.07 melt index in which is incorporated up to 11.0% of polypropylene of 0.905 g/cm$^3$ density and 0.78 melt flow rate.

SUMMARY OF THE INVENTION

The present invention provides an improved blend consisting essentially of low density polyethylene and crystalline polypropylene, which blend can be melt-spun into fibers at surprisingly much higher speeds and temperatures than non-blended polyethylene can be melt-spun. In the improved blend, the polyethylene amounts to 65 to 95% by weight of the blend and has a density in the range of 0.90 to 0.92 g/cm$^3$, a melting temperature of less than 107° C. and a melt index of at least 25, and the polypropylene amounts to 5 to 35% by weight of the blend and has a melt flow rate of at least 3, and a ratio of weight-to-number average molecular weight of at least 4. In preferred blends, the polyethylene density, melting temperature and melt index are respectively in the ranges of 0.905 to 0.913 g/cm$^3$, 102° to 106° C. and 30 to 70, and the polypropylene melt flow rate and molecular weight ratio are respectively less than 35 and less than 12. In further preferred blends, the polyethylene amounts to 75 to 85% and the polypropylene, 15 to 25% of the blend weight.

The present invention also provides a fiber made from the above blend. In the fiber, the polyethylene forms a continuous phase in which the polypropylene is dispersed as a second phase.

In another embodiment of the invention a process is provided for making fibers from the blend in which the blend is melt-spun at a temperature in the range of 205° to 265° C., preferably at least 230° C., and at a speed of at least 1740 m/min, preferably at least 2500 m/min. In still another embodiment, the invention provides a process for making and bonding a nonwoven fabric formed with binder fibers melt-spun from the blend.

BRIEF DESCRIPTION OF THE DRAWINGS

The invention will be more readily understood by reference to the drawings in which.

DETAILED DESCRIPTION OF PREFERRED EMBODIMENTS

Figure 1:
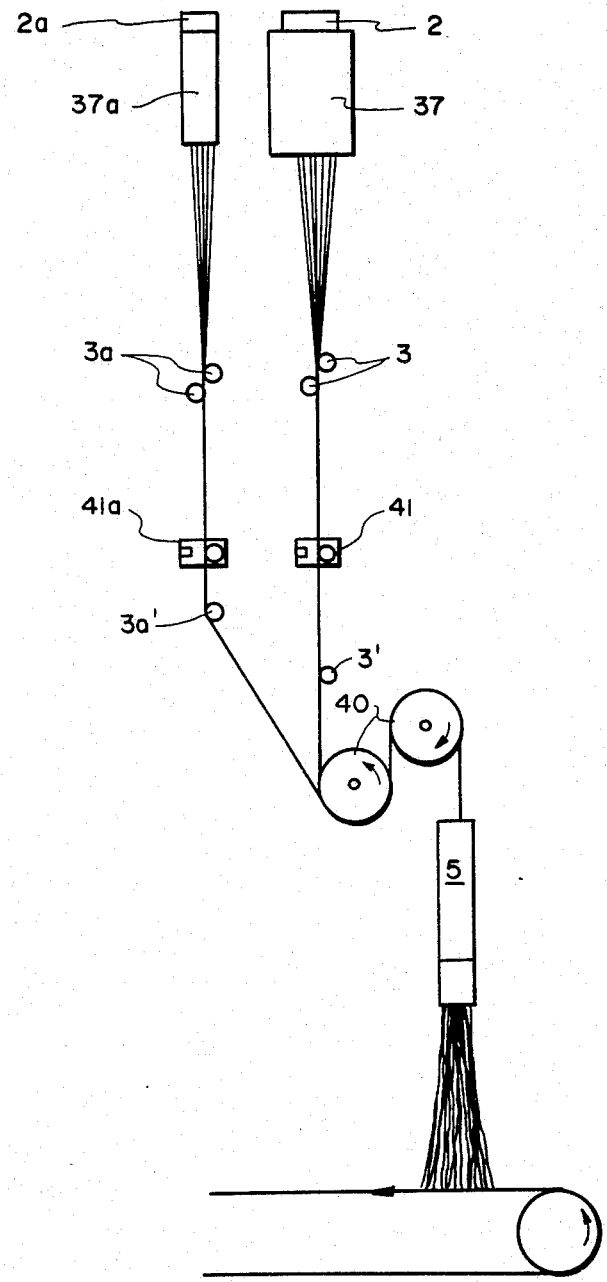
FIG. 1 is a schematic representation of an apparatus suitable for preparing a nonwoven web in which binder fibers of a blend of the invention are included and FIG. 2 is a graph which depicts the maximum melt-spinning speed at 260° C. of various blends of a low density polyethylene and crystalline polypropylene.

The blends of the present invention are formed from crystalline (i.e., isotactic) polypropylene and particular low-density, branched polyethylene polymers. The polyethylene is the major component, amounting to between 65 and 95%, preferably 75 to 85% by weight of the blend. The polypropylene is the minor component of the blend and provides the complemental amount of polymer to complete the blend (i.e., 35 to 5%, preferably 25 to 15%). Of course the usual additives, such as thermal, oxidative and ultraviolet stabilizers may be added to the blend in conventional amounts.

The low-density polyethylene suitable for use in the blends of present invention generally is a branched polyethylene having a melting temperature of less than 107° C., a density in the range of 0.90 to 0.92 g/cm$^3$ and a melt index of at least 25 and usually below 200. For best high-speed, high-temperature melt-spinning of filaments of the polyethylene/polypropylene blends of the invention, polyethylenes of 0.905 to 0.913 g/cm$^3$ density, 102° to 106° C. melting temperature and 30 to 70 melt index are preferred.

The crystalline polypropylene suitable for use in the blends of the present invention generally is an isotactic polypropylene having a melt flow rate of at least 3 and a molecular weight distribution, as determined by gel permeation chromatography such that the weight average molecular weight, Mw, is at least 4 times the number average molecular weight, Mn. Preferably, the melt flow rate is less than 35 and the ratio of weight-to-number average molecular weight is less than 12. Such polypropylenes have a wide molecular weight distribution and are of the type that are obtained directly from the polymerization reactor without a further "cracking" treatment. These polymers are sometimes called "reactor grade" polypropylenes.

The polyethylene and polypropylene may be blended together and then melt spun in conventional equipment by conventional techniques. However, as demonstrated particularly in Examples 3 and 4 below, the blend compositions of the invention are clearly superior in high-speed and high-temperature spinning performance as compared to blends made with high-density polyethylene or with low-density polyethylenes that have melt indices below about 25. These latter blends have very erratic spinning characteristics at high temperatures, especially above about 250° C. These latter blends also exhibit much lower filament-breaking speeds than those that can be achieved under the same conditions by melt-spun blends of the invention.

The fibers melt-spun from blends of the invention contain two phases; a polypropylene phase which is dispersed in a continuous phase of polyethylene. The polypropylene takes the form of elongated droplets in the filaments. Many of the droplets measure about 7 microns in length by about 5 microns in diameter. However, there is considerable variation in the droplet size. These fibers exhibit two distinct melting temperatures which correspond to the melting temperatures of each component.

The process of the invention for producing the above-described fibers comprises melt-spinning a blend of the invention at a temperature in the range of 205° C. to 265° C. and at a speed of at least 1740 meter/min (1900 yds/min). The spinning speed preferably is no more than 60% of the speed at which filaments break when melt spun at the particular spin temperature. Preferred temperatures and speeds for melt spinning filaments in accordance with the invention are respectively 240° to 265° C. and at least 2300 meters/min.

The present invention also includes a process for producing a nonwoven fabric. The process comprises melt-spinning as described hereinbefore a polymer blend of the invention to form a first group of filaments, quenching the first group of filaments, bringing the first group of filaments together with a second group of filaments which have a higher melting temperature than the polyethylene component of the first group of filaments, forming a composite web of the two groups of filaments and bonding the web by compressing the web while heating it to a temperature above the melting temperature of the polyethylene component. The second group of filaments may be of a polyester, polypropylene, high-density polyethylene or other polymer. Isotactic polypropylene is the preferred polymer for the second group of filaments.

In the above-described process for making a nonwoven fabric of the invention, the compressing of the web may be accomplished with flat or embossed rolls. Embossed rolls provide a bonded pattern to the fabric.

Fiber of this invention can also be employed to make nonwoven fabric without the use of another higher melting temperature fiber. However, very careful control of the bonding time and bonding temperature are necessary. The bonding time should be short and the bonding temperature should be approximately equal to the melting temperature of the polyethylene component of the low-density polyethylene/polypropylene fiber. In this manner nonwoven fabrics made completely of fibers of the blends of the invention can be produced.

The particular procedures that were used to determine the various characteristics reported herein as follows. ASTM refers to the American Society of Testing Materials and TAPPI refers to the Technical Association of Pulp and Paper Industry.

| Measurement | Units | Reference |
|---|---|---|
| Density | g/cm$^3$ | ASTM D 792-56 |
| Melting temperature | °C. | DSC* |
| Melt index | grams/10 min | ASTM 1238(E) |
| Melt flow rate | grams/10 min | ASTM 1238(L) |
| Molecular weight | — | GPC** |
| Unit weight | g/m$^2$ (oz/yd$^2$) | ASTM D 646 |
| Grab tensile strength | N/cm (lb/in) | ASTM D 1682 |
| Elongation | % | ASTM D 1682 |
| Elmendorf tear | N (lb) | ASTM D 1424 |
| Trapezoidal tear | N (lb) | ASTM D 2263 |
| Thickness | mm (inch) | ASTM D 1774 |
| Bulk | mm/g/m$^2$ (in/oz/yd$^2$) | *** |
| Gurley-Hill porosity | sec/100 cm$^3$/ 6.45 cm$^2$ | TAPPI 460-M-49 |
| Porosity | m$^3$/m$^2$/min (ft$^3$/ft$^2$/min) | ASTM D 737 |

*DSC: differential scanning calorimeter operated at a 10° C./min heating rate.
**GPC: gel permeation chromatography.
***Bulk: thickness divided by unit weight.

In the examples which follow various aspects of the invention are illustrated. All parts and percentages are by weight. MD and XD properties respectively refer to longitudinal (i.e., machine direction) and transverse (i.e., cross-machine direction) properties of the fabric. Example 1 shows the melt-spinning of textile-denier filaments from blends of the invention. Example 2 describes in detail the manufacture of a nonwoven fabric made with binder filaments in accordance with the invention. Example 3 illustrates the advantageous manner in which a preferred blend of the invention can be melt-spun into filaments at higher speeds than either component of the blend could be spun by itself. Finally, Example 4 summarizes data from a series of tests which helped establish the various preferred limits on parameters of the claimed invention.

EXAMPLE 1

In this example, filaments of textile denier were melt-spun at high speed from a preferred blend of low density polyethylene and crystalline polypropylene:

A blend was formed of (a) 80 parts of polyethylene (NA-270, manufactured by USI Chemicals) having a density of 0.909 g/cm$^3$, a melting temperature of 103.4° C., and a melt index of 70, and (b) 20 parts of polypropylene (PP 3014 manufactured by Exxon) having a density of about 0.90 g/cm$^3$, a melting temperature of about 165° C. and a melt flow rate of 12. The blend was melted, further blended and extruded at 260° C. at a total rate of 4.54 kg/hr (10 lbs/hr) through a spinneret having 110 Y-shaped orifices with each arm of the Y measuring 0.38-mm long by 0.13-mm wide by 0.17-mm deep (0.015×0.005×0.007 inch). Throughput per orifice was 0.69 g/min, spin-stretch ratio was 441, shear rate was 3266 reciprocal seconds and wind-up speed was 2439 m/min (2667 yards/min). This direct melt-spinning operation involved no drawing, other than spin-stretching of the filaments. The thusly produced filaments had a dtex of 2.8 per filament (2.5 denier per filament), a tenacity of 1.15 dN/tex (1.3 gpd), an elongation of 150% and a trilobal cross-section of 1.40 modification ratio. The yarn formed from these filaments exhibited two melting points, one at about 105° C. corresponding to the polyethylene component and one at about 165° C. corresponding to the polypropylene component. Microscopic examination of the filament cross-sections also gave evidence of a two-phase polymer blend. The minor component, the polypropylene, appeared as elongated droplets in a matrix of the major component, the polyethylene.

EXAMPLE 2

In this example, a nonwoven fabric was prepared from filaments of polypropylene and binder filaments of a polyethylene/polypropylene blend in accordance with the invention. This example also demonstrates the advantageous capability of the binder filaments to be melt-spun at the same high speeds as the main filaments (i.e., the polypropylene filaments, also called "matrix" filaments) of the web.

A twenty-position, commercial machine for making continuous filament, spunbonded, nonwoven fabrics was used to melt spin matrix filaments of polypropylene and binder filaments of a polyethylene/polypropylene blend in accordance with the invention and to combine the filaments into a nonwoven fabric. The apparatus included at each position of the machine is represented diagramatically in FIG. 1. Isotactic polypropylene, containing thermal and ultraviolet stabilizers and having a melt flow rate of 32, was melt spun through spinneret 2 to form matrix filaments. Spinneret 2 contained 1050 holes of circular cross-section measuring 0.97 mm (0.020 inch) in diameter and 2.41 mm (0.095 inch) in length. Throughput was 0.47 g/min/hole. Binder filaments consisting of a blend of 80 parts polyethylene and 20 parts polypropylene were melt spun from spinneret 20 which had 95 Y-shaped holes each measuring 0.38-mm long by 0.13-mm wide by 0.17-mm deep (0.015×0.005×0.007 inch). Binder filament throughput was 0.80 g/min/hole.

The polypropylene polymer for the matrix filaments was melted in a 120-mm diameter twin screw extruder which operated with a 232° C. outlet temperature and then melt spun into filaments of 2.6 dtex (2.3 denier per filament) through spinneret 2 which was maintained at 250° C. The 80/20 melt blend of polyethylene and polypropylene for the binder filaments was blended in flake form and then melted and further blended in a 83-mm diameter twin screw extruder. The blend was then melt spun into filaments of 4.3 dtex (3.9 dpf) through spinneret 2a which also was maintained at 250° C. The same polymer blend as used in Example 1 was used in the blend of the binder filaments of this example.

The polypropylene matrix filaments were quenched to a temperature below 60° C. by radial flow of cooling air in radial quench chimney 37. The melt-blend polyethylene/polypropylene binder filaments also were quenched to a temperature below 60° C. by a cross-flow of cooling air in cross-flow quench chimney 37a.

The thusly formed bundle of matrix filaments and bundle of binder filaments were then respectively passed over guides 3 and 3a, charged by corona discharge devices 41 and 41a to 27,000 esu/m², and passed over guide 3' and 3a'. Then, both bundles were converged on a pair of rolls 40, each of which operated at a surface speed of 1829 meters/min (2000 yards/min). The combined matrix and binder filaments were then advanced as a ribbon from the last roll 40 through high pressure, pneumatic-slot-jet diffuser 5. The width of the filament ribbon was 26.7 cm (10.5 inches). The ribbon of combined filaments was then forwarded from jet diffuser 5 to a moving collection belt on which the filaments were deposited to form a swath.

The twenty swath-forming positions were arranged in four rows of jets with five positions per row. Each row was perpendicular to the direction of collection-belt movement. The slot jet of each position was at an angle to the perpendicular so that the swath formed by each jet overlapped by about 50% the swaths formed by adjacent jets in the row. In this manner, an overlapped, layered, wide sheet was formed. The sheet was then exposed to steam at 100° C. and compacted under a load of 14.3 kg/linear cm (80 lbs/linear inch) by under a consolidation roll. The speed of the collection belt was adjusted to provide consolidated sheet of two unit weights, 50.9 g/m² (1.5 oz/yd²), and 67.8 g/m² (2 oz/yd²).

The above-described consolidated sheets were calendered at 4.6 m/min (5 yds/min) between smooth rolls at a temperature of 150° C. and at a load of 286 kg/linear cm (1600 lbs/linear inch). The resultant fabric was uniformly bonded. Each area of fabric contained approximately the same number of bonds as any other area. Properties of the resultant bonded fabrics were as follows:

| Unit Weight, g/m² (oz/yd²) | 50.9 | (1.5) | 67.8 | (2.0) |
|---|---|---|---|---|
| Grab Tensile, N/cm (lb/in) | | | | |
| MD | 49 | (28) | 67 | (38) |
| XD | 35 | (20) | 40 | (23) |
| Elmendorf Tear, N (lbs) | | | | |
| MD | 19.6 | (4.4) | 24.0 | (5.4) |
| XD | 18.2 | (4.1) | 22.3 | (5.0) |
| Gurley-Hill Porosity | 17 | | 25 | |

A portion of the consolidated, not calendered sheet of 50.9-g/m² (1.5 oz/yd²) unit weight was pattern bonded at a speed of 6.1 m/sec (20 ft/min), at a temperature of 140° C. and under a load of 89.5 kg/linear cm (500 lbs/linear inch) between a patterned roll having 20% compacting area and a smooth, heated back-up roll. Properties of the resultant pattern-bonded fabric were as follows:

| Unit Weight, g/m² (oz/yd²) | 50.9 (1.5) |
|---|---|
| Grab Tensile, N/cm (lb/in) | |
| MD | 46 (26) |
| XD | 32 (18) |
| % Elongation | |
| MD | 42 |
| XD | 48 |
| Trapezoidal Tear, N (lb) | |
| MD | 28.0 (6.3) |

-continued

| | |
|---|---|
| XD | 26.7 (6.0) |
| Bulk, mm/g/m² (inch/oz/yd²) | 0.0062 (0.0083) |
| Porosity, m³/m²/min (ft³/ft²/min) | 75.2 (247) |
| Subjective Softness | Excellent |

EXAMPLE 3

This example illustrates the advantage of a preferred polypropylene/polyethylene blend of the invention in providing higher speeds of melt-spinning than could be obtained with 100% polyethylene or 100% polypropylene or with blends of the same polymers having compositions that were outside the polyethylene/polypropylene ratios required by the present invention.

A series of blends of polyethylene and polypropylene pellets was fed to a twin-screw extruder, melted and forced by means of a gear (metering) pump through a filter pack and spinneret plate to form filaments. The spinneret plate had 70 capillaries of circular cross-section arranged in two concentric circles of 5.1-cm (2-inch) and 3.8-cm (1.5-inch) diameter, which respectively accommodated 40 and 30 capillaries. Each capillary was 0.038 cm (0.015 inch) in diameter and 0.229 cm (0.090 in) in length and had an included entrance angle of 60°.

The filaments were melt-spun with the spinneret at a temperature of 260° C. and were then quenched by a cross flow of cooling air at room temperature. The polymer flow rate per hole was 0.90 grams/min. The quenching zone provided a uniform cross-flow of air at a velocity of 0.46 m/s (1.5 ft/sec) and extended from 3.9 cm (1.5 inches) below the spinneret to 57.2 cm (22.5 inches) below the spinneret. A feed roll (i.e., filament withdrawal roll) was located 3.6 meters (142 in) from the spinneret. A U-guide was located about 3.15 meters (124 in) from the spinneret. The feed roll surface speed at which filaments broke was determined by increasing the feed roll speed until most of the filaments broke (usually all of the filaments broke at about the same speed) and by averaging at least three such measurements of break speed for each polymer blend. For the tests of this example, polyethylene of 0.9096 g/cm³ density, 103.4° C. melting temperature and 70 melt index and polypropylene of 0.9022 g/cm³ density, 164.0° C. melting temperature, 8.7 melt flow rate, and 8.8 ratio of weight-to-number average molecular weight were used.

Figure 2:
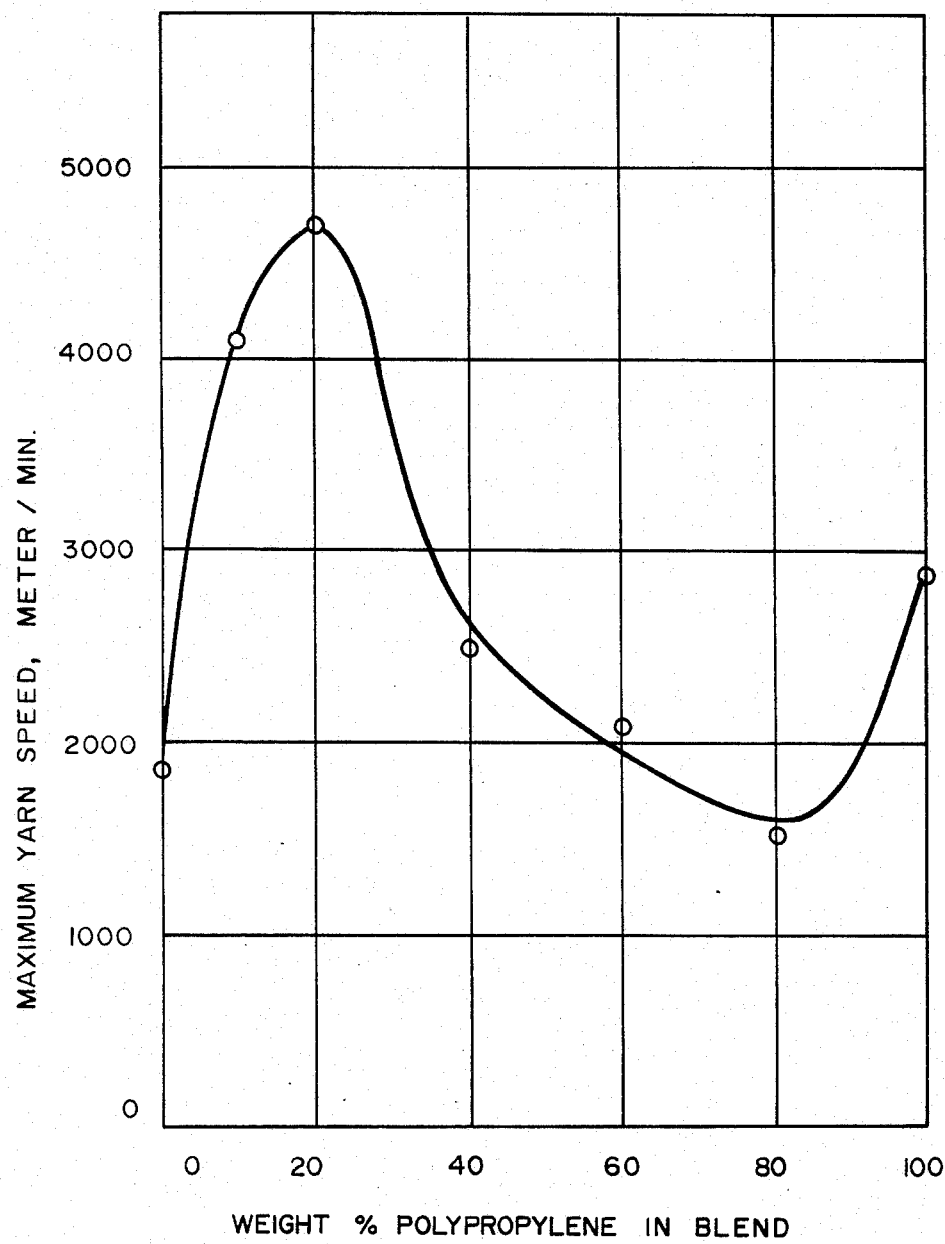

The following table, which summarizes the results of these tests, demonstrates that a higher spinning speed can be obtained by using blend compositions of the invention rather than by using other blends or 100% polyethylene or 100% polypropylene. FIG. 2 graphically presents these results.

| Blend Composition, % | | Speed to Break Filaments |
|---|---|---|
| Polyethylene | Polypropylene | m/min (yd/min) |
| 100 | 0 | 1847 (2,020) |
| 90 | 10 | 4107 (4,491) |
| 80 | 20 | 4711 (5,152) |
| 60 | 40 | 2448 (2,678) |
| 40 | 60 | 2062 (2,255) |
| 20 | 80 | 1526 (1,669) |
| 0 | 100 | 2882 (3,152) |

EXAMPLE 4

This example describes the melt-spinning of blends of various polyethylene and polypropylene polymers. The particular polymers used are designated herein with upper-case letters and had the following properties:

| Polyethylene Polymers | | | | | |
|---|---|---|---|---|---|
| Designation | A | B | C | D | |
| Melting Temperature, °C. | 103.4 | 104.9 | 109.9 | 130.0 | |
| Density, g/cm³ | 0.909 | 0.913 | 0.915 | 0.950 | |
| Melt Index | 70 | 30–35 | 1.9 | 27 | |
| Viscosity poise* | 480 | 800 | 10,000 | ** | |
| Polypropylene Polymers | | | | | |
| Designation | Q | R | S | T | U |
| Melting Temperature, °C. | 164 | 163.5 | ** | 163.4 | 163.0 |
| Density, g/cm³ | 0.902 | 0.900 | 0.892 | 0.900 | 0.892 |
| Melt Flow Rate | 3.4 | 8.7 | 19.4 | 19.6 | 35 |
| Molecular Weight Ratio* | 8.7 | 11.3 | 9.8 | 5.3 | 5.0 |
| Viscosity, poise* | 30,000 | 9,000 | 5,200 | 2,900 | 1,600 |

**No measurement made
*Estimated zero shear viscosity at 260° C.
*Ratio of weight-average to number-average molecular weight Polyethylene polymer A was "Petrothene" NA-270 manufactured by USI Chemicals; B was LD-502 manufactured by Exxon; C was "Alathon" 20 manufactured by Du Pont; and D was PE-9122 manufactured by Gulf. Polypropylene polymer Q was a virgin blend; and polymers R, S, T and U were respectively PLDT-147, PLDT-167, PLDT-168 and PD-3125, each manufactured by Exxon.

The same equipment and procedure as was used in Example 3 was employed in this example to melt-spin at 260° C. polymer blends of 80 parts polyethylene and 20 parts polypropylene into filaments. As in Example 3 the speeds at which the filaments broke were determined for each blend and compared to the breaking speed of filaments made of 100% of the same polyethylene and of 100% of the same polypropylene as was used in the blend. The following table summarizes results of the tests. Tests C-1 and C-2 are comparison tests.

| | Polymers | | Filament-Breaking Speed, m/min | | |
|---|---|---|---|---|---|
| Test No. | Poly-ethylene | Poly-propylene | 100% Poly-ethylene | 100% Poly-propylene | 80/20 Blend |
| 1 | A | R | 1847 | 2282 | 4710 |
| 2 | A | U | 1847 | 6675 | 4298 |
| 3 | A | T | 1847 | 4574 | 3904 |
| 4 | A | S | 1847 | 4070 | 4441 |
| 5 | A | Q | 1847 | 2044 | 4120 |
| 6 | B | R | 710 | 2882 | 3020 |
| C-1 | C | R | <90 | 2882 | 195 |
| C-2 | D | R | 0 | 2882 | 1435 |

Note that in the tested blends, polyethylene polymers A and B, which were low-density (i.e., in the 0.90 to 0.92 g/cm³ range) branched polyethylenes having a melt index of greater than 25 and melting temperatures of less than 107° C., were readily melt spun at 260° C. at speeds of greater than 3000 meters/min. In contrast, as shown by comparison test C-1, low-density polyethylene C (i.e., 0.915 g/mc³), in an 80/20 blend with isotactic, crystalline polypropylene, could not be melt spun at speeds greater than 195 m/min. Note that polyethylene polymer C had a melting temperature of 109.9° C. and a melt index of 1.9. In the blend of comparison test C-2, in which high-density, linear polyethylene polymer D (0.950 g/cm³ density, 130° C. melting temperature and 27 melt index) was used, a filament breaking speed of only 1435 m/min could be achieved.

On the basis of the tests and comparisons described in these examples, as well as on other tests in which similar results were obtained, the various limits set forth in the claims were established on the properties of polymers suitable for use in the blends of the present invention.

I claim:

1. In a blend consisting essentially of low density polyethylene and crystalline polypropylene, the improvement wherein the polyethylene amounts to 65 to 95% by weight of the blend and has a density in the range of 0.90 to 0.92 g/cm³, a melting temperature of less than 107° C. and a melt index of at least 25, and the polypropylene amounts to 5 to 35% of weight of the blend and has a melt flow rate of at least 3, and a ratio of weight-to-number average molecular weight of at least 4.

2. A blend of claim 1 wherein the polyethylene amounts to 75 to 85% and the polypropylene amounts to 15 to 25% by weight of the blend.

3. A blend of claim 1 or 2 wherein the polyethylene density, melting temperature and melt index are respectively in the ranges of 0.905 to 0.913 g/cm³, 102° to 106° C., and 30 to 70, the polypropylene melt flow rate is less than 35, and the polypropylene ratio of average molecular weights is less than 12.

4. A blend of claim 1 or 2 in the form of fiber in which the polyethylene constitutes a continuous phase in which the polypropylene is dispersed as a second phase.

* * * * *